United States Patent [19]

Sabry et al.

[11] Patent Number: 5,760,935
[45] Date of Patent: Jun. 2, 1998

[54] OPTICAL COMMUNICATIONS NETWORK

[75] Inventors: Martin Sabry; John Midwinter, both of London, United Kingdom

[73] Assignee: Northern Telecom Limited, Montreal, Canada

[21] Appl. No.: 591,543

[22] PCT Filed: Sep. 12, 1994

[86] PCT No.: PCT/GB94/01976

§ 371 Date: Jan. 26, 1996

§ 102(e) Date: Jan. 26, 1996

[87] PCT Pub. No.: WO95/08247

PCT Pub. Date: Mar. 23, 1995

[30] Foreign Application Priority Data

Sep. 14, 1993 [GB] United Kingdom .................. 9318979

[51] Int. Cl.$^6$ .................. H04J 4/00; H04J 14/00
[52] U.S. Cl. .................. 359/123; 359/117; 359/119; 359/168; 370/404
[58] Field of Search .................. 359/123, 118–119, 359/117, 168; 370/404, 405, 406, 408

[56] References Cited

U.S. PATENT DOCUMENTS

| | | | |
|---|---|---|---|
| 3,731,002 | 5/1973 | Pierce | 370/405 |
| 5,351,146 | 9/1994 | Chan et al. | 359/123 |

OTHER PUBLICATIONS

Sabry et al., "A Modular and Scalable Transparent Optical Network", ECOC '93, Sep. 12–16, 1993, Proceedings, vol. 3, pp. 97–100.

*Primary Examiner*—Kinfe-Michael Negash
*Attorney, Agent, or Firm*—Lee, Mann, Smith, McWilliams, Sweeney & Ohlson

[57] ABSTRACT

An optical communications system comprises an inner core network, a plurality of outer networks coupled to the core, and local networks coupled to the outer networks whereby to provide access to terminals coupled to the network. Information transported between terminals across the network is carried via pixels in a discrete communications space defined by time and wavelength co-ordinates.

9 Claims, 8 Drawing Sheets

M = 10
w = 50
F = 16

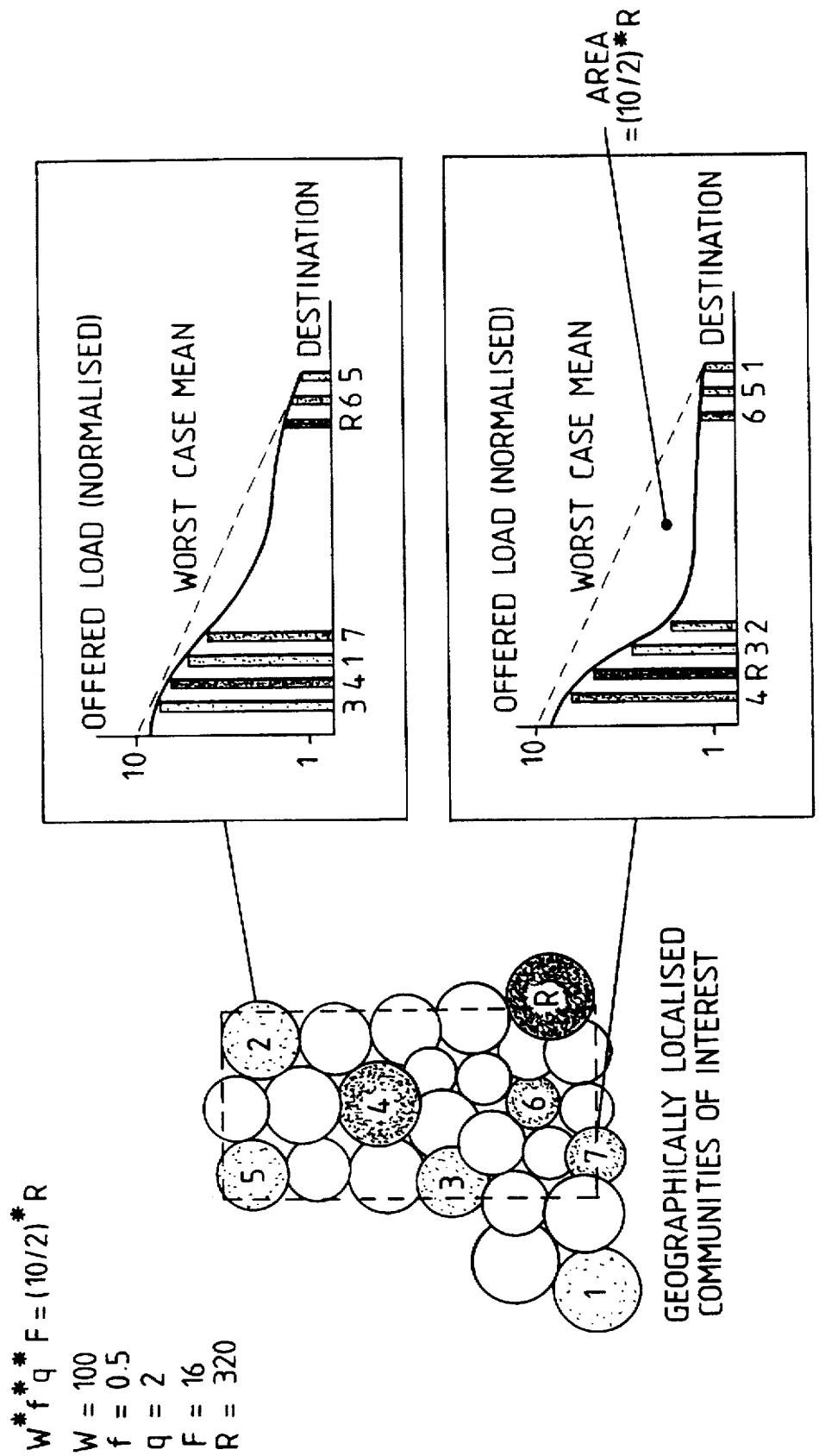

OPTICAL COMMUNICATIONS NETWORK

This invention relates to communications networks and in particular to optical communications networks.

BACKGROUND OF THE INVENTION

Optical fibre transmission is a widely used technique in the communications field. The technique has the major advantages of low attenuation and high bandwidth in comparison with electronic transmission techniques. However, in communications network applications, the use of fibre has not extended significantly beyond trunk transmission. Thus, local transmission and switching are performed electrically. This requirement for both electrical and optical communications introduces two significant limitations. Firstly there is the need to provide electronic/optical and optical/electronic interfaces between the two transmission media. Secondly, the bandwidth restrictions of the electrical part of the network present the full potential bandwidth available in the optical spectrum from being utilised. For example, the complete radio and microwave spectrum has a bandwidth of about 300 GHz, whereas the potential bandwidth available in the optical spectrum in the typical transmission wavelength range of 1500 to 1600 nm is of the order of 4000 to 6700 GHz.

Furthermore, in a communications network, it is necessary to provide a number of levels of multiplexing, the highest level being used for trunk transmission. This necessitates the provision of multiplexing and demultiplexing equipment. Although the recent introduce of synchronous systems (SDH) to replace the present plesiochronous systems (PDH) has resulted in a reduction of the volume of multiplexing/demultiplexing equipment required, this equipment still represents a significant proportion of the overall system cost.

It is an object of the invention to minimise or to overcome those disadvantages.

SUMMARY OF THE INVENTION

According to the invention there is provided an optical communications network, including an inner core network having a plurality of nodes, outer networks coupled to at least some of said nodes, and local distribution networks each coupled to a said outer network and each providing access to a plurality of terminals, wherein information transported via the network between terminals is carried in elements of a two dimensional discrete communications space, each said element being defined by respective time and wavelength co-ordinates.

The communications space extends throughout the network

The network architecture is designed to be integrated with, and eventually replace, the current network in incremental steps from the top down using a common set of components throughout. In general this will ensure that maximum benefit can be derived by spreading costs amongst users at the higher network levels, and reductions in component costs, due to mass production of standardised modules at the subsequent lower levels.

In the first stage of evolution we envisage existing transmission links within an inner core network being upgraded to use Dense WDM transmission but with each carrier operating within the Synchronous Digital Hierarchy (SDH) to standard interfaces. Later these interfaces would be replaced by transparent wavelength switches and thereby facilitate transmission between rings entirely in the optical domain. Ultimately, individual customers could be serviced directly through passive optical networks (PONs) optically connected to the rings.

In a high capacity network carrying traffic multiplexed from many users, one would not expect the mean traffic flow along routes to fluctuate by large amounts in short times. Accordingly, we propose that the traffic carrying ability in the inner and outer core networks (mesh and rings) should be allocated on a slowly time varying basis (~hours), initially in blocks of one optical carrier e.g. at the synchronous transport module standard STM-4. The choice of STM-4 may seem low, at a time when much interest centres on transmitting at STM-16 or higher rates, however, we have two reasons for proposing it. Firstly, a nation-wide transparent optical network with transmission at 1550 nm over distances up to the order of 1000 km is most likely to be limited to a data rate less than 1 GBit/s per carrier due to material dispersion, as much of the dark fibre installed and the fibre already used is optimised for transmission around 1300 nm. Secondly, in order to minimise the amount of time domain processing on the multiplexed signals we are concerned to identify a traffic capacity building block appropriate as the minimum unit of capacity to be allocated between any two core nodes in the network. However, as the network is extended to include rings and the opto-electronic boundary is brought closer to the customers, we can introduce a limited degree of time division (albeit without time shifting buffers at nodes) in order to further sub-divide the communication space. Recognising that telecommunications is based around an 8 kHz sampling cycle corresponding to a 125 µs frame duration, we propose dividing it into 16 sub-frames (SF), each of about 7.8 µs. Thus the minimum capacity block would be reduced to about 38 MBit/s. By using more sophisticated technology the basic building block units may for example be designed around the higher rate STM-16. It will be appreciated that the technique is in no way limited to any particular rate. As the time/wavelength communications space extends throughout the network. This obviates the need for any multiplexing or demultiplexing facilities thus providing a significant cost saving in comparison with a conventional network.

BRIEF DESCRIPTION OF THE DRAWINGS

An embodiment of the invention will now be described with reference to the accompanying drawings, in which:

FIG. 7 shows a core network traffic module;

DESCRIPTION OF PREFERRED EMBODIMENT

Figure 1:
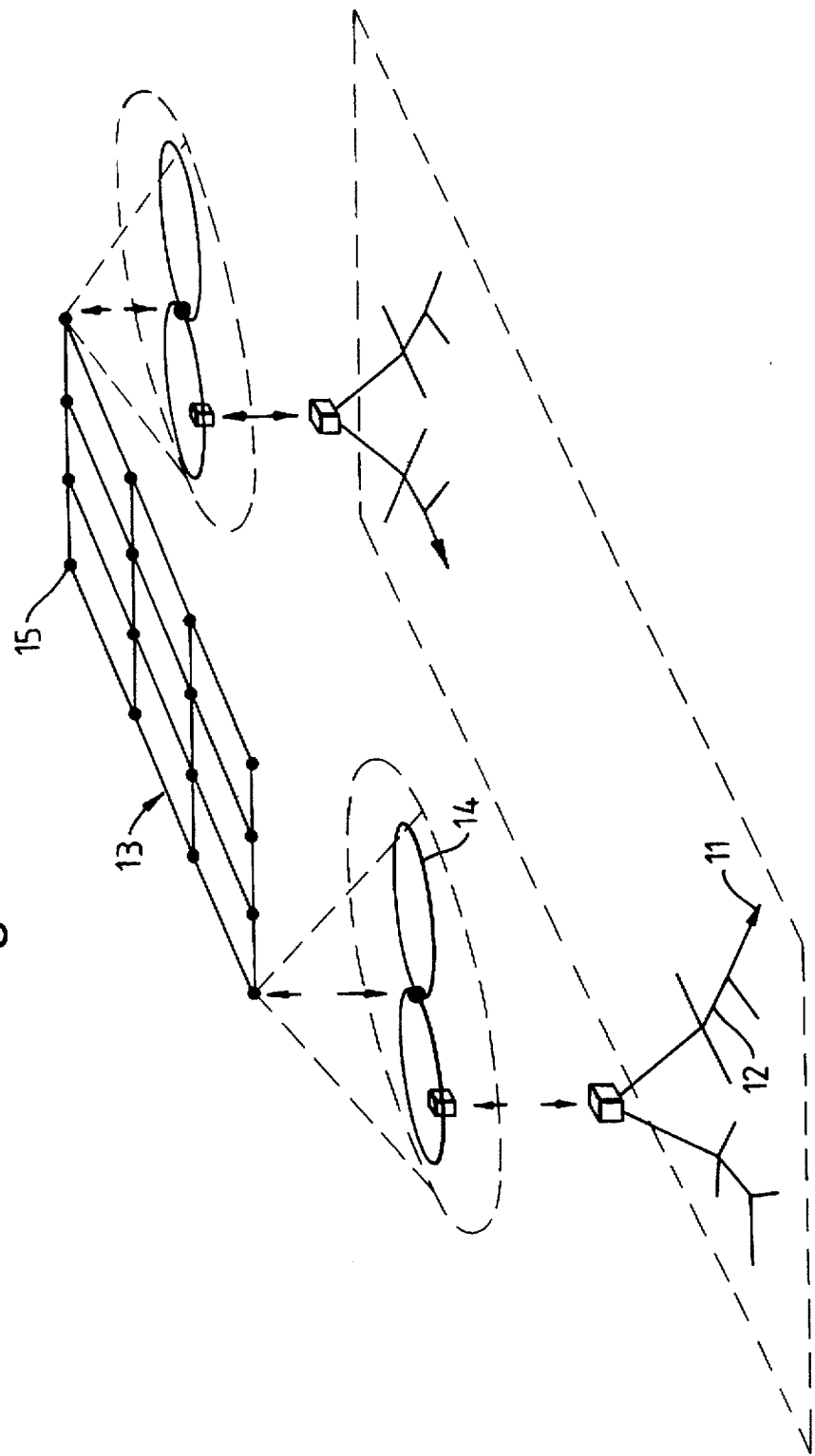
FIG. 1 is a schematic diagram of a communications network according to the invention.

Referring to FIG. 1, the network provides communication between a plurality of terminals 11 via access passive optical networks (PON's) 12 and a network core comprising an inner mesh core 13 and outer core rings 14. The inner core 13, which comprises the highest hierarchical level of the network, is a highly interconnected mesh. Each of the core nodes 15 provides routing within the inner core and at least some core nodes also provide access to respective outer core rings 14. The latter are provided with ring nodes 16 which nodes access the passive optical networks 12 to which the user terminals 11 are coupled. In the arrangement of FIG. 1, traffic is carried end-to-end between terminals in a wholly optical manner using time division and wavelength division multiplexing (WDM).

Figure 2:
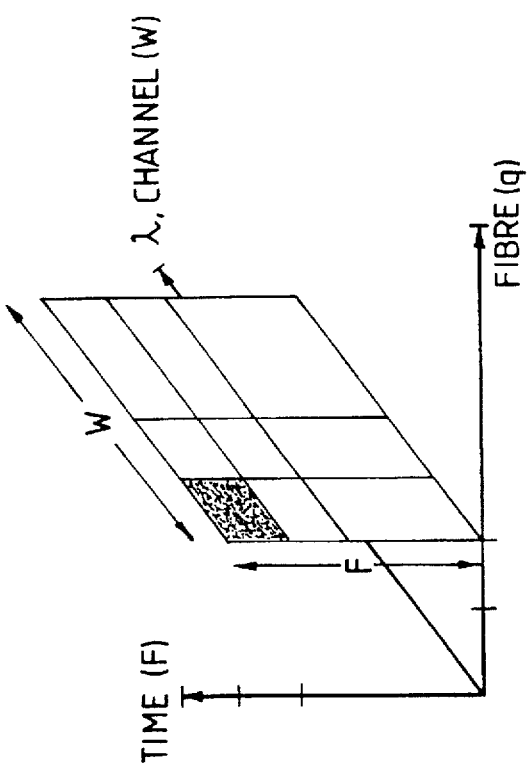
FIG. 2 illustrates the principle of communication within the network of FIG. 1.

FIG. 2 illustrates the way in which information is transported in the network of FIG. 1. The figure illustrates the concept of a communications space within an optical fibre transmission path. Information is carried in pixels or elements 21 in a two dimensional discrete communications space 20, each pixel or element being defined by respective wavelength ($\lambda$) and time (t) co-ordinates. The communications space is the same in any fibre of the network whether that fibre is part of a trunk line or is a user link to a subscriber terminal. The plane 20 in FIG. 2 represents the communication space in a single fibre. As has already been pointed out, it is possible to wavelength multiplex and one can therefore think of the frequency dimension as divided into bands each representing a transparent optical channel. In addition, time is also partitioned analogous to conventional Time Division Multiplexing (TDM). Combined, the two multiplexing techniques result in a matrix of pixels each of which may be described by a unique ($\lambda$, T) reference within the fibre. Thus each pixel within the communication space might correspond to one optical STM (synchronous transport module) channel. A third dimension may be added to accommodate the possibility that more than one fibre may exist between any two points in a network. In contrast to the dimensions of the time-channel plane, which are the same at any point in any optical network, the extent of the fibre dimension may vary through a network. Moreover, in order to maintain all optical transmission paths the only type of operation that can be permitted when switching is to shift the time-wavelength plane (or parts of it, say one pixel) within this dimension, i.e., space switching.

Figure 3:
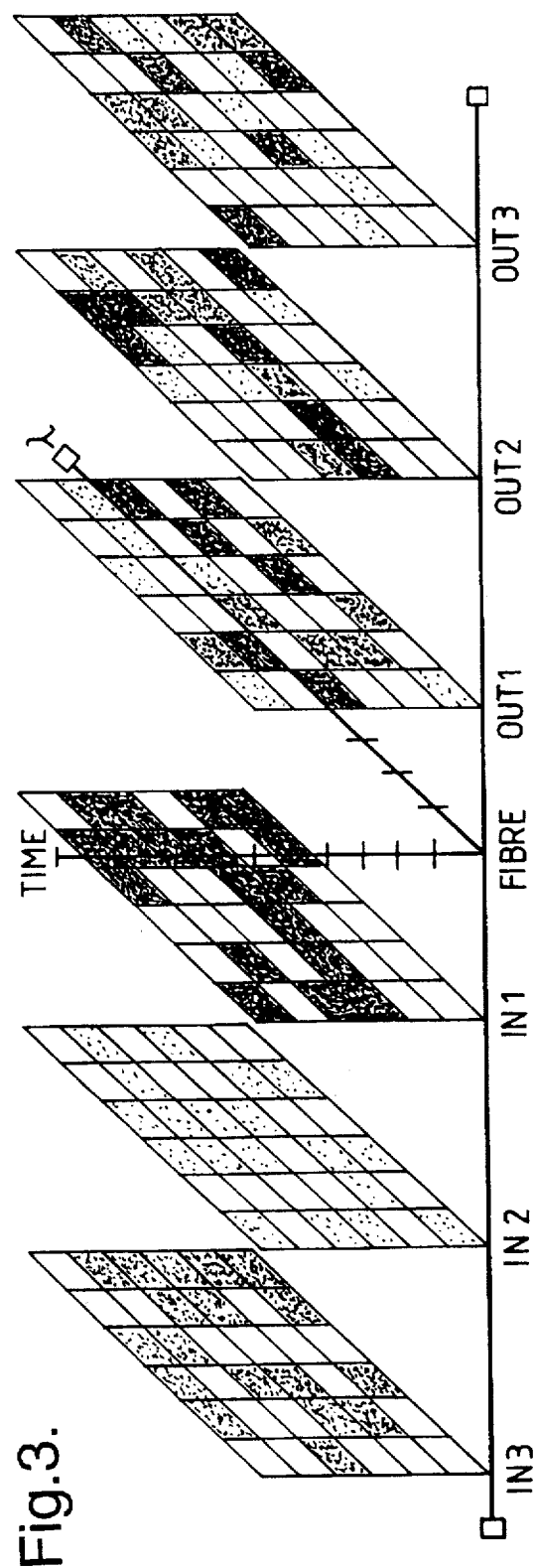
FIG. 3 illustrates the communication process at a core node of the network of FIG. 1.
Figure 4:
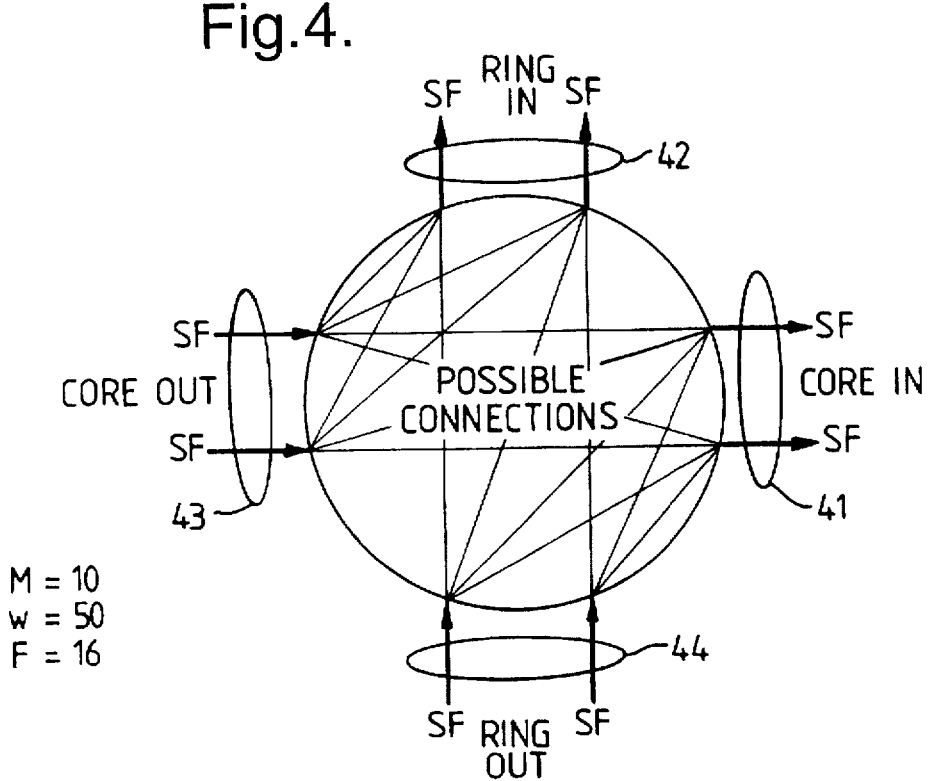
FIG. 4 shows the schematic construction of a core node for the network of FIG. 1.

A node in a mesh network will generally have several input and output fibres connecting it to a number of different nodes. Given that nodes have the ability to separate the individual wavelength slots on each of their input fibres and reassemble them in a different configuration on their output fibres, we can use the fact that the output fibres lead to different nodes, to route wavelength channels through the network. If we further assume that the amount of time required by the node to reconfigure the mapping of wavelength slots is relatively small compared to the degree of time division, each of the pixels in FIG. 2 may be thought of as a "temporary" transparent data channel which can be used to make an arbitrary point to point connection in the network. As we are proposing all optical switching, the pixels must maintain their position within the time-wavelength planes of the fibres, from the input to the output of a node and indeed throughout the whole multinode network. FIG. 3 shows a hypothetical all optical mapping for a node with 3 input and 3 output fibres each filled (indicated by the shaded pixels) to half of the theoretically available capacity. To perform switching entirely within the optical domain, each pixel maintains its position within the time-wavelength plane of the communications space. Accordingly the pixels are mapped by shifting them along the fibre axis The functionality of a core node is illustrated in a different manner in FIG. 4. The node comprises a wavelength switch, without wavelength or time shifting, which controls paths between core and ring inputs 41, 42 and core and ring outputs 43, 44 respectively.

Switching between rings and core nodes, as well as from a ring to a core and vice-versa are all required. However, as the capacity in both the core and the rings is allocated in subframes, if M is the total number of fibres entering (and leaving) each node, w the number of active wavelength channels per fibre and F the number of sub-frames at the basic building block rate of 38 MBit/s (or 155 MBit/s), then the node can be seen to be a switch receiving M–w–F input channels and cross connecting them to M-w-F output channels, irrespective of whether the individual fibres are part of a ring or the mesh network. In other words, a single type of core node may be provided, and it may be used either in conjunction with rings or purely as part of the inner core network switching fabric. As a consequence the rings should be integer multiples of sub-frames in circumference as well as unidirectional, in order to maintain both the timing within the inner core network and their self-healing properties. In a typical arrangement, the total number M of fibres may be 10, the number W of wavelength channels may be 50 and the number F of subframes may be 16 giving a throughput of between 0.3 and 1.24 TBit/s made up of 8000 independently routed basic channels.

In order to synchronise the switching of subframes in the core network, all sections of fibre in that network should be of a length corresponding to integral multiples of the subframe interval. For example, an 8 kHz frame rate divides into 16 subframes implies, on average, an additional 0.75 km of fibre in each cable termination. Moreover, a general band of about 700 ns between data contained in consecutive subframes is desirable to allow for differences in propagation delay caused by dispersion effects.

Although capacity may be allocated in blocks of 38 MBit/s (or 155 MBit/s) within and between rings, if the opto-electronic border is to be brought out to the individual customers, the network must realistically be capable of providing as little capacity as 64 kBit/s channels. We therefore propose that the sub-frames be composed of time slots of a duration sufficient for the transmission of standard ATM (asynchronous transfer mode) cells (about 680 ns at STM-4 or about 170 ns at STM-16) which may be dropped into or extracted from a PON individually. As a result, it is possible to transmit information from customer to customer entirely within the optical domain in denominations ranging from an ATM cell upwards.

Figure 5:
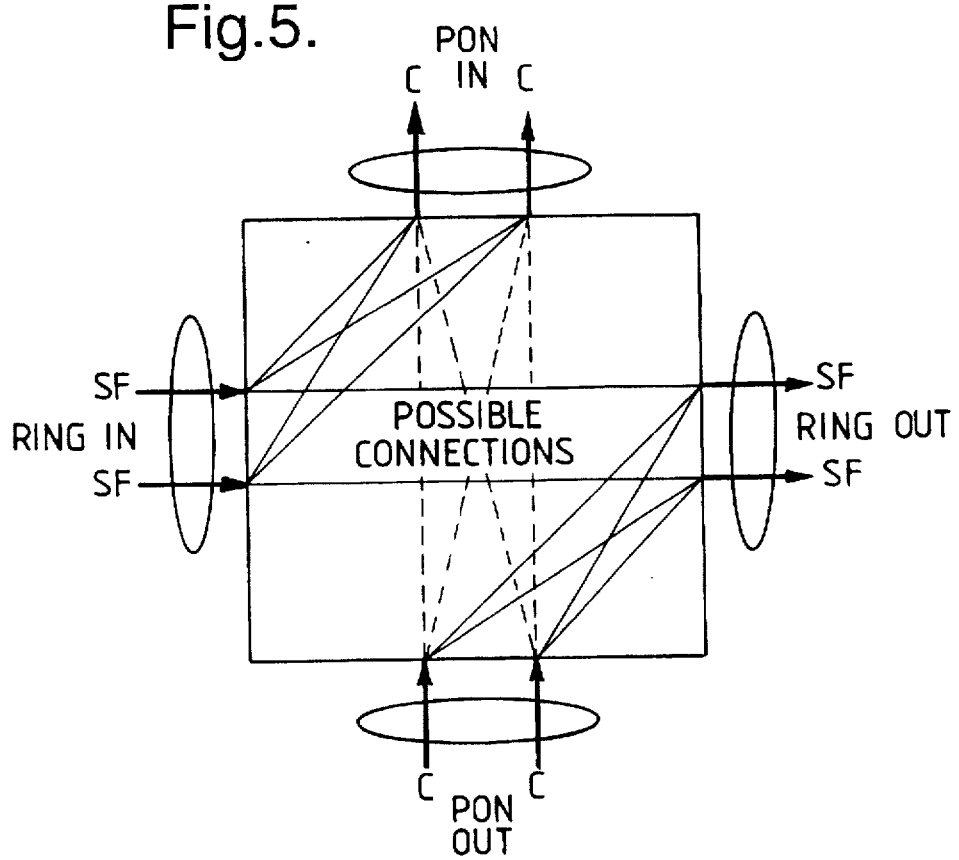
FIG. 5 shows the schematic construction of a ring node of the network of FIG. 1.

The ring-PON interface is shown in FIG. 5. Similar to the core node, it accesses all the incoming wavelength channels. Several input and output fibres may exist on the ring level. However, as all these fibre by definition pass through the same sequence of nodes, no subframe to subframe switching is required. The real purpose of these switches is to establish access to one or more PONs from the ring. Consequently, the routing which takes place is based on a sub-frame to ATM cell (C) transformation. The nodes continuously examine optical pre-headers which preceded every ATM cell (indicating the cells' final destination PON on the ring) and then direct them individually, either to the appropriate PON, or to the ring level output fibre for further transmission down the line of PONs. Depending on the exact configuration of the ring-PON interface the pre-header may be lost when the ATM cell is dropped into a PON, but as no further routing decisions are required before the customer terminal this is of no consequence. In the cases where a ring is made up of several fibres, the node also ensures that packets injected from the customers on a PON are directed to the correct ring fibre. Connections between customers on different rings are then established by injecting ATM cells into vacant slots in a sub-frame channel that connects the relevant rings. Since the routing pattern of the sub-frames is predetermined at the inner core level, the data channels i.e. the pixels within the fibre communication space may be viewed as set of postal pigeon holes each addressing a different destination ring. Consequently, the transmission of information from source to destination is reduced to the insertion and removal of ATM cells at the two involved ring-PON interfaces. Moreover, as these are both strictly localised processes, maintaining precise timing is required within the individual PONs.

Communication between customers on the same ring is achieved by allocating additional sub-frame channels used for local traffic only. If the two customers happen to be on the same PON or on PONs connected to the ring at the same point, the ATM cells simply make one complete round trip before they are dropped back into the PON. Alternatively, an additional level of switching may be introduced, indicated by the dashed lines in FIG. 5 that would allow ATM cells belonging to this category of traffic to be routed directly within the ring-PON node. This would not require the introduction of a new level of functionality, as the processing necessary is a subset of that, which has already been specified for the other kinds of traffic managed by this type of node.

Figure 6:
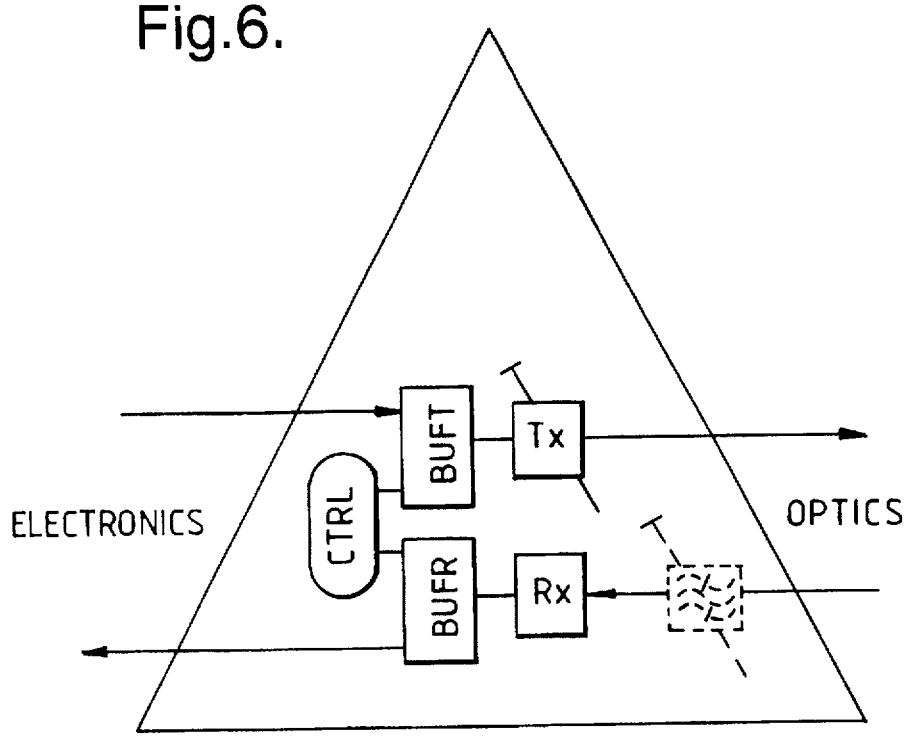
FIG. 6 shows an interface between the network and a user terminal.

It will be appreciated that electronic interfaces will be required at the periphery of the network. In line with the development strategy outlined above, the specification of these opto-electronic interfaces must remain the same throughout the expansion of the network. As shown in FIG. 6 the optics consist of two main components; a tuneable narrow line-width laser TX and a photo-detector RX. A tuneable wavelength discriminatory device may also be inserted into the receiving path if one desires the terminal to be able to single out a unique wavelength channel if several appear on the input fibre simultaneously. The two electronic modules are the control circuitry CTRL required for the correct operation of the terminal and high speed buffer memories. BUFR and BUFT are associated with the photodetector and the laser respectively. The buffer memory BUFR ensures that when an ATM cell destined for the terminal is detected by the optical receiver it may be stored temporarily in order to allow the data to be read out at the lower bit rate anticipated on the electronic side of the interface. In this way the only high speed electronics (STM-4 or STM-16) used in the network are the two 53 byte memory cells in each terminal.

There now follows an analysis of the communications network described above. This analysis is given by way of example and demonstrates the flexibility of the techniques described herein.

Analysis of the core network

As previously stated, the function of the core network is to establish high capacity "transparent" data channels between geographically localised communities of interest. We assume the traffic in the inner core can be partitioned into R geographically localised communities, each of which can be covered by a ring, and that all have similar statistical characteristics in terms of local and inter community traffic flows. If the distribution of traffic originating from a ring is plotted versus the remaining rings, where these are ordered in sequence according to the proportion of the traffic they receive, we further assume this to show a substantially linear distribution with an order of magnitude difference between the most and least popular communities of interest as illustrated in the traffic module shown in FIG. 7. Consequently, if w×q×f is the number of channels available for external traffic in a ring, where w is the number of active wavelength channels per fibre, q is the number of files and F is the number of subframes, then the value of this packet must be maintained greater than or equal to $(10/2)\times R$. For example, if there is a minimum of 2 fibres in the rings, each with an equivalent of 50 wavelengths, each partitioned onto 16 sub-frames dedicated to core traffic, the network can accommodate a minimum of $50\times2\times16=320$ rings. Within the context of a national UK network this would imply rings with an average radius of roughly 30 km assuming a uniform population density across the country. Alternatively, with $25\times10^6$ network subscribers, it implies ~78,000 customers per ring.

Although we envisage that only part of the time-wavelength-fibre space will be used for transmission at any one time, we also assumed that the connection pattern in the core would be (albeit slowly) varying dynamically. Consequently, there will be a finite probability that a new channel along a given route can not be accommodated and therefore must be denied if requested. If the network control algorithms do not possess any "intelligence" and requests for new channels are made, as well as allocated, utterly at random, the highest probability for blocking, $P_B$, arises when trying to make a connection along the longest route where the transmission space, on all stages, is one channel short of being utilised to its maximum permitted level. If $f_i$ denotes the maximum fraction of the total number of wavelength slots allowed to be active in each fibre, and $q_i$ the number of fibres in the $i^{th}$ cable along the route, then $P_B$ is given by eqn. (1) where p is number of wavelength slots tested.

$$P_B = \{1-(1-f_i^{q_i})\times \ldots \times(1-f_{i-1}^{q_{i-1}})\times(1-f^{p})\}^p \qquad (1)$$

Assuming that the filling factor, f and the number of the fibres, q, is the same throughout the whole of a route for a given connection and all vacant channels are tested, eqn. (1) may be rewritten as eqn (2) below, where q, l and f are defined as above and W is the number of channel slots in a fibre.

$$P_B = \{1-(1-f^q)^p\}^{(1-f\cdot q\cdot W)} \qquad (2)$$

For example, if there are 8 and 2 fibres per cable in the core and ring networks respectively, with 100 wavelength slots and a 50% filling factor in each fibre, then the probability for not making a connection between two rings separated by 11 core nodes (longest path in 7×7 rectangular mesh) should be $5\times10^{-28}$ on any particular chosen route.

Analysis of the access network

Figure 8A:
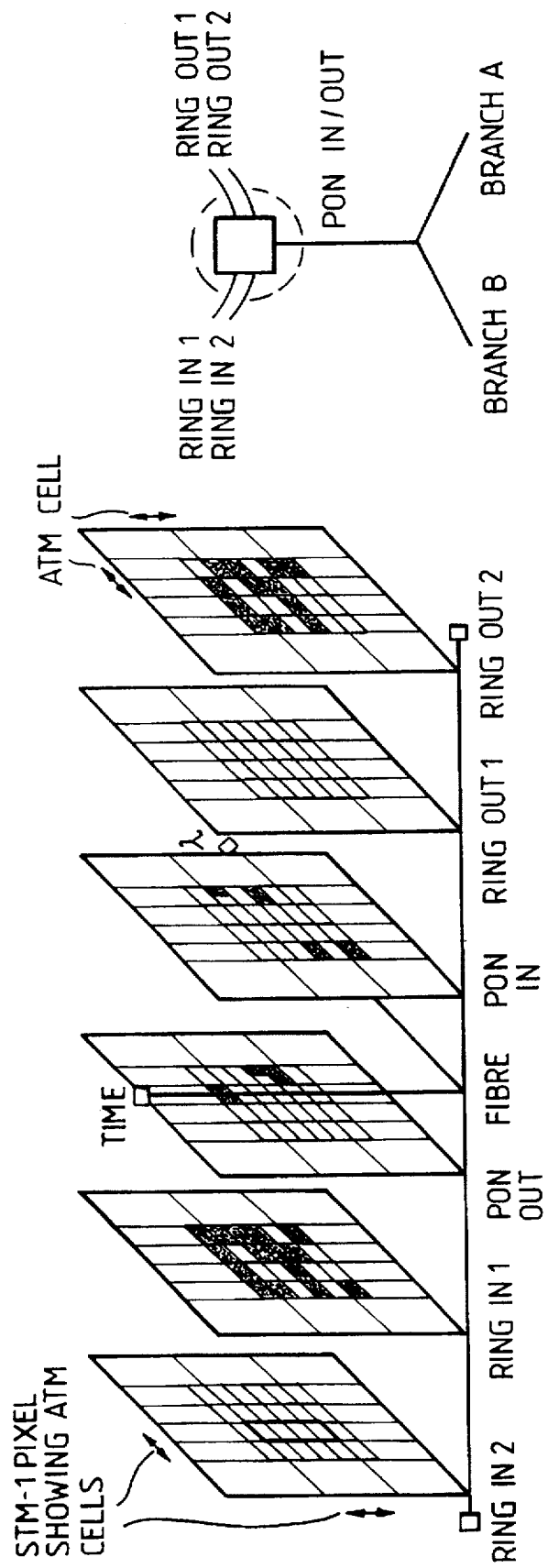
FIGS. 8a–8b illustrates the operation of a ring-passive optical network interface.
Figure 8B:
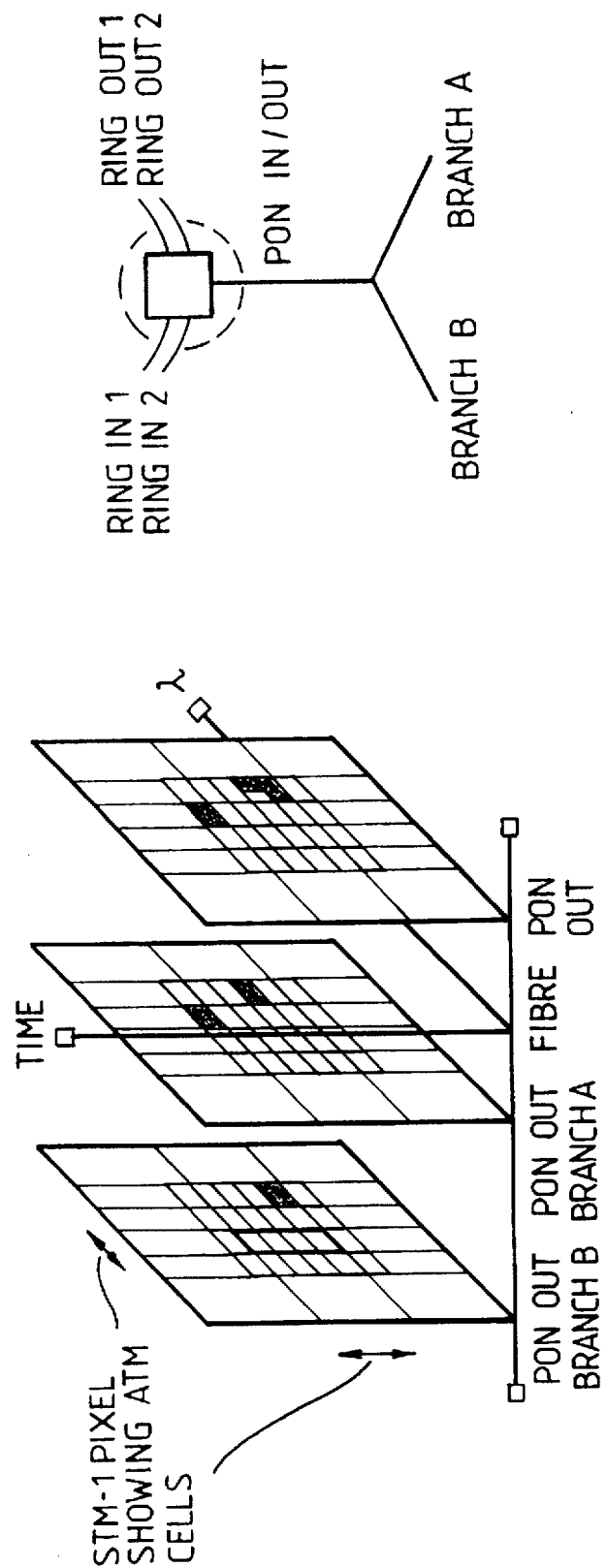

In addition to the blocking which may take place within core network, there exist an additional set of blocking probabilities within the access network which arise from contention between ATM cells. FIG. 8 depicts a conceptual view of the interaction between a ring consisting of two fibres and a PON. The upper part of the figure shows a hypothetical switching pattern for the ring-PON interface, depicted in a manner similar to that previously presented for the core node, FIG. 3. The pixels resulting from the original partition of the communication space, i.e. the basic core communication channels are delimited by the bold lines. In accordance with the proposed architecture, these have been further divided into smaller areas within the time dimension to represent the individual ATM cells. As was the case for the capacity available in the core network, these carry a varying amount of traffic (indicated by the shaded areas) depending on the offered load and the existing traffic patterns. As previously stated, a ring-PON interface, represented in FIG. 5, does not perform any SF→SF switching, nor does it facilitate ATM cell to ATM cell switching between the ring input and output fibres.

In general there can exist three different types of contention within the access network. When an ATM cell is injected into the network by a terminal it will cause a collision if the given ATM slot already contains another cell. Accordingly, the network control should keep track of which of the slots in the various data channels in a ring are in use at any given point in time and only make those that are empty available for "new" connections. This implies that before a connection can be established between two terminals, the one which initiates the request must signal the network to determine the time and wavelength references of the appropriate channels which are available as well as which ATM slots are unused within them. Given that a ring consists of two or more fibres the control algorithm must also verify that two terminals in the same PON are not competing for identical ATM slots on different fibres as this will result in the cells colliding within the PON. In such cases, only one of the available slots may be allocated. The control issues associated with these two types of collision may be administered by the local hardware which oversees the dialogues between the PONs (terminals) and their rings. These localised control centres would though not store sufficient information about the whole network for a terminal to determine, at the time of initiating a call, whether the receiving terminal is available or in fact if the time-wavelength reference chosen for the transmission of ATM cells will cause contention with already existing connections between other PONs in other rings and the receiving PON. Thus, the third type of contention arises from potential collisions in the receiving PON. Viewed from the position of a ring receiving a number of calls (or request for calls), however, this new set of administrative control issues are again localised. We therefore suggest that this network architecture lends itself to distributed control concentrated, for example, in each ring. Communication between terminals would then only require the involvement of the control centres directly affected, i.e. generally only two.

In order to further quantify the issues raised above, we present a general analysis of the various levels of contention and blocking identified in the access network. If x ATM cells are selected at random from W.f.q ATM slots the probability that they are all destined for the same PON is given by Px defined by eqn. (3).

$$P_x = \frac{1^x}{n} \left(1 - \frac{(1)}{n}\right)^{w \cdot f \cdot q - 1} C_x^{w \cdot f \cdot q} \qquad (3)$$

For example, if a ring has the dimensions used above and the ATM cells transmitted in a certain slot are distributed between 500 PONs (which in the context of a network with $25 \times 10^6$ customers and 320 rings implies ~150 customers per PON), the likelihood that a PON does not receive an ATM cell is P0=0.819.

If terminals grab empty slots at complete random, the probability that a given slot is duplicated in a PON is given by eqn. (4). Naturally, this is impossible unless there are two or more fibres in a ring, i.e. for q≧2.

$$\frac{f \cdot (q-1)}{N} \qquad (4)$$

In the case where receivers are not wavelength selective, it follows that only one terminal per PON can receive an ATM cell per ATM slot. Consequently, in order to fully use the allocated transmission capacity, the number of PONs, N, in a ring must be greater than or equal to the number of active wavelengths. N≧W.f.q. Given that one or more channels have been established between two rings the probability of making an ATM connection is the product of a slot not being duplicated in the transmitting PON, and being empty in the receiving PONs, eqn. (5), where p is the number of empty ATM slots tested.

$$\left[ 1 - \left[ \frac{1}{n} \cdot f \cdot (q-1) \right] \right]^r \cdot [1 - [1 - P_u]^p] \qquad (5)$$

Figure 9:
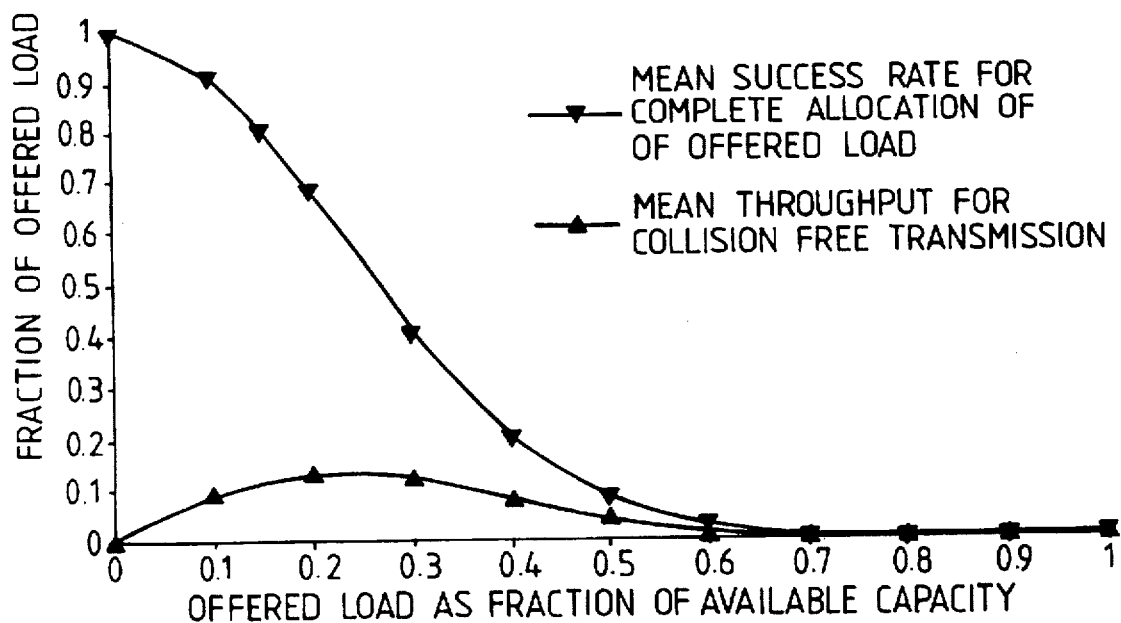
FIGS. 9, 10 and 11 illustrate mean success rate and throughput from the network of FIG. 1.

For example, if two rings have 500 PONs and 2×50 active channels each, and only one 38 MBit/s channel is connecting them, a single 64 kBit/s line may on average be established 96.7% of the time, as long as the channel is operated at less than 99.6% of its total capacity. Alternatively, if the same rings only had 100 or 50 PONs, the number of customers per PON would increase to approximately 750 and 1500 and the probability for making a given connection would be reduced to 59.8% or 24.8% respectively. It is understood that, if we measure hardware in terms of the number of PONs (and hence size and number of ring-PON interfaces) and performance in terms of the likelihood of being able to make a given connection, we can generally trade one for the other. However, in order to determine the overall blocking which takes place in a ring it is necessary to take the traffic arriving from all the other rings in the whole network into account. Eqn. (6), and FIG. 9 express the probability of being able to allocate all the receiving capacity required (W.f.q.$f_R$) without contention (for N=500), given that the traffic pattern is totally random, where $f_R$ is the fraction of the allocated capacity that is used. They indicate that it is extremely unlikely that it will be possible to fully allocate all the available capacity within a ring such that no contention exists, but that this should continuously become more readily achievable as the offered load is reduced.

$$\frac{N!}{[N - W \cdot f \cdot q \cdot f_R]!} \qquad (6)$$
$$N^{W \cdot f \cdot q \cdot f_R}$$

The average fraction ∅ of injected ATM cells which are successfully transmitted, (evaluated as 1-$P_{collision}$) versus the ring traffic load can be expressed as the fraction of PONs receiving exactly one wavelength with respect to the mean number of filled ATM slots, (mean number of PONs receiving exactly one ATM cell per ATM slot)/(W.f.q.$f_R$), eqn (7).

$$\phi = \frac{\left[\frac{1}{n}\right]^1 \left[1 - \frac{1}{n}\right]^{W \cdot f \cdot q \cdot f_R - 1} C_1^{W \cdot f \cdot q \cdot f_R} \times N}{W \cdot f \cdot q \cdot f_R} = \left[1 - \frac{1}{N}\right]^{W \cdot f \cdot q \cdot f_R - 1} \qquad (7)$$

Figure 10:
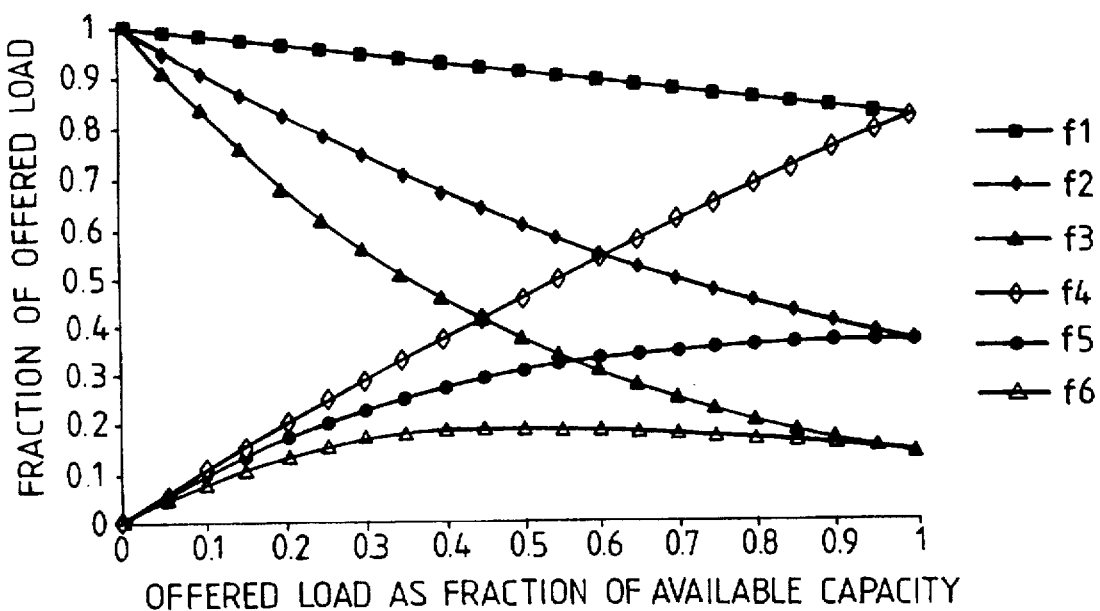

FIG. 10 plots ∅ and the gross throughput, given as the product of the load and the success rate, versus $f_R$. It reveals that rings with the dimensions used in the above examples, even without wavelength selective receivers, would have an 82% success (or 18% failure) rate, as well as throughput, when fully loaded. In general, the throughput curves calculated for the examples with 500 and 100 PONs per ring, do not exhibit maxima. This implies that the throughput will increase continuously in step with the load. In other words, we would not expect it to be necessary to build safeguards into the network control to cope with congestion as is currently proving to be necessary with conventional ATM. However, in the example where the ring only had 50 PONs the throughput shows a shallow maximum of about 0.5. This result suggests that when the number of PONs in a ring is small compared to the address space desired in the inner core (which is a function of the total number of rings and the respective traffic distributions) care should be taken to limit the injected traffic to the optimum level or the receivers in the terminals should be specified as wavelength selective.

If terminals are given the ability to select the individual wavelength channels appearing simultaneously on the input fibre, we can remove the restriction of a single ATM cell per PON per ATM slot. In its place, it will be necessary to prevent two ATM cells being transmitted in identical ATM slots on different fibres (presupposes $q \geq 2$), being dropped into the same PON at the same time. Since the W.f active channels are selected at random from W in each of q fibres the probability that a given wavelength channel is used exactly j times is given as Qj.

$$Q_j = f^j (1-f)^{qrins-j} C^{qrins} \quad (8)$$

The probability that this wavelength is chosen more than 1 time if x wavelengths are chosen out of W.f.q is:

$$P_{j,x} = 1 - \frac{C_x^j \cdot C_x^{W.f.q-j} + C_1^j \cdot C_{x-1}^{W.f.q-j}}{C_x^{W.f.q-j}} \quad (9)$$

Hence, the mean number of packets that collide in a PON per ATM slot is PQ.

$$PQ = \sum_{x=2}^{W.f.q} \left( P_x \cdot W \cdot \sum_{j=2}^{q} Q_j \cdot P_{j,x} \right) \quad (10)$$

Figure 11:
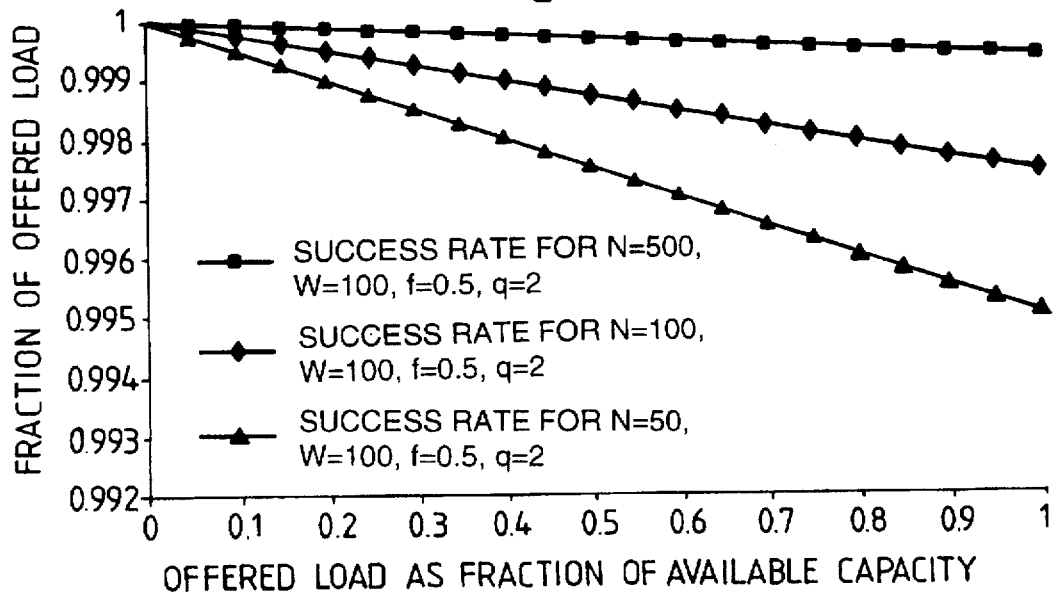

FIG. 11 plots the expected success rate and gross throughput for a ring where all terminals have wavelength selective receivers, eqn. (11), versus the offered load (where f in PQ is replaced by $f \times f_R$).

$$\text{Throughput} = 1 - \frac{PQ \cdot N}{W \cdot f \cdot q \cdot f_R} \quad (11)$$

A comparison between FIG. 10 & 11 reveals that this modification of the customer terminals causes a marked improvement in all three examples. The decision of whether to introduce the additional complexity and cost of wavelength selectivity in each terminal will ultimately depend upon the required performance and the relative dimensions of the inner and the outer core, and the number of PONs in each ring.

The throughput graphs, eqn. (7 & 11), plotted in FIGS. 10 & 11 represent the total fraction of traffic passing through the network and arriving uncorrupted at its destination. Accordingly (1-Throughput) describes the proportion of data which is lost or corrupted. Therefore, depending on the protocol, this may be equated to either a Bit Error Rate (BER), or to the proportion of the gross offered load which is retransmitted data. If the basic protocol does not incorporate retransmission, the net throughput will be equal to the gross throughput but with a Packet Error Rate imposed by the protocol. In the case where the terminals are wavelength selective this equates to a BER ranging from $5 \times 10^{-3}$ to $5 \times 10^{-4}$ for the three examples given. In comparison, if all corrupted packets are retransmitted the control itself will not give rise to a BER, although the net throughput will be reduced by a factor equal to the original success rate, i.e. net throughput=offered load×success rate. For example, if the overall transmission rate is 2.4 GBit/s (corresponding to STM.16) the aggregate capacity per instruction at 100% loading is 2 MBit/s for non-wavelength selective receivers and 3 MBit/s for wavelength selective receivers. So, similarly to the hardware vs. performance trade-off described above, we find that there exists a relationship between protocol issues and the performance/characteristics of the network.

We claim:

1. An optical communications network, including an inner core network having a plurality of nodes, a plurality of outer networks coupled to at least some of said nodes, and local distribution networks each coupled to a said outer network and each providing access to a plurality of terminals, wherein information transported via the network between terminals is carried in optical signals comprising elements of a two dimensional discrete communications space extending throughout the network between said terminals, each said element in said discrete communications space being uniquely defined by respective time and wavelength co-ordinates.

2. An optical network as claimed in claim 1, wherein each said element corresponds to an optical synchronous transport module channel.

3. An optical network as claimed in claim 1, wherein switching is effected by space switching of elements.

4. An optical network as claimed in claims 1, wherein said inner core network comprises a mesh.

5. An optical network as claimed in claim 4, wherein each said outer network comprises a ring.

6. An optical network as claimed in claim 5, wherein said ring is unidirectional.

7. An optical network as claimed in claim 4 wherein each said local network comprises a passive optical network (PON).

8. An optical network as claimed in claim 5, wherein capacity within the inner core and the outer network rings is allocated in subframes, and wherein each said ring corresponds in circumference to an integral number of subframes.

9. A method of transporting information from a transmitter terminal to a receiver terminal in an optical communications network having an inner core network having a plurality of nodes, a plurality outer networks coupled to at least some of said nodes, and local distribution networks each coupled to a said outer network and each providing access to a plurality of terminals, the method comprising converting the information at the transmitter terminal to corresponding optical signals comprising elements of a two dimensional discrete communications space, each said element of said discrete communications space being defined uniquely by respective time and wavelength co-ordinates, transporting the optical signals comprising said elements via the network between said terminals, and recovering said information from the optical signals received at said receiver terminal.

* * * * *